US012670794B2

(12) United States Patent
Berezin et al.

(10) Patent No.: US 12,670,794 B2
(45) Date of Patent: Jun. 30, 2026

(54) SYSTEM AND METHOD OF TRAFFIC SIGNAL VIOLATION RISK ASSESSMENT AND WARNING

(71) Applicant: GM Global Technology Operations LLC, Detroit, MI (US)

(72) Inventors: Vyacheslav Berezin, Newmarket (CA); Alaa M. Khamis, Courtice (CA); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 18/512,745

(22) Filed: Nov. 17, 2023

(65) Prior Publication Data

US 2025/0166508 A1     May 22, 2025

(51) Int. Cl.
*G08G 1/16*          (2006.01)
*B60W 30/18*         (2012.01)
(Continued)

(52) U.S. Cl.
CPC ....... *G08G 1/164* (2013.01); *B60W 30/18154* (2013.01); *B60W 40/02* (2013.01); (Continued)

(58) Field of Classification Search
CPC ................. B60W 10/18; B60W 10/20; B60W 2040/0818; B60W 2420/403; B60W 2540/229; B60W 2555/20; B60W 2556/35; B60W 2556/50; B60W 30/09; B60W 30/18154; B60W 40/02; B60W 40/08; G06V 20/54; G06V 20/58; G06V 20/584;
(Continued)

(56) References Cited

U.S. PATENT DOCUMENTS 5,983,161 A * 11/1999 Lemelson ............... G01S 19/11
                                                        340/436
10,059,334 B1 * 8/2018 Zhu ................... G08G 1/096725
(Continued)

FOREIGN PATENT DOCUMENTS

CA        2703384 A1 *  5/2009  ............. G08G 1/164
CA        3093700 A1 *  9/2019  ............. G08G 1/087
(Continued)

*Primary Examiner* — Babar Sarwar
(74) *Attorney, Agent, or Firm* — Vivacqua Crane, PLLC

(57) ABSTRACT

A system and method for traffic signal violation risk assessment for a vehicle. The system includes a sensor such as a front camera module (FCM) configured to capture an image in a field of view forward the vehicle; a vehicle communications system configured for at least one of vehicle-to-infrastructure (V2I) communications and telematic communications with an infrastructure unit, wherein the infrastructure unit is capable of providing intersection information; and a traffic signal violation risk assessment (TSVR) module in communication with the FCM and the vehicle communications system. The TSVR module analyzes the captured image to determine an intersection, a traffic light at the intersection, and a traffic light current state (TLCS); collect intersection information from the infrastructure unit, and determine a risk of traffic signal violation based on the information and implement a physical action to mitigate the risk.

19 Claims, 7 Drawing Sheets

(51) Int. Cl.
    *B60W 40/02*         (2006.01)
    *B60W 40/08*         (2012.01)
    *G06V 20/58*         (2022.01)
    *G08G 1/0967*       (2006.01)

(52) U.S. Cl.
    CPC ........... *B60W 40/08* (2013.01); *G06V 20/584*
    (2022.01); *G08G 1/096725* (2013.01); *G08G*
    *1/096783* (2013.01); *G08G 1/166* (2013.01);
    *B60W 2040/0818* (2013.01); *B60W 2420/403*
    (2013.01); *B60W 2540/229* (2020.02); *B60W*
    *2555/20* (2020.02); *B60W 2556/35* (2020.02);
    *B60W 2556/50* (2020.02)

(58) Field of Classification Search
    CPC ........ G08G 1/00; G08G 1/017; G08G 1/0967;
    G08G 1/096725; G08G 1/096783; G08G
    1/16; G08G 1/164; G08G 1/166; H04W
    4/44
    See application file for complete search history.

(56) References Cited

U.S. PATENT DOCUMENTS

| | | | | |
|---|---|---|---|---|
| 11,008,000 | B2 * | 5/2021 | Chang | B60W 30/09 |
| 11,052,851 | B1 * | 7/2021 | Anvari | G16H 10/60 |
| 11,055,894 | B1 * | 7/2021 | Kreter | G06T 13/80 |
| 11,390,299 | B2 * | 7/2022 | Ahn | B60W 60/001 |
| 11,433,888 | B2 * | 9/2022 | Ito | B60W 30/09 |
| 11,912,274 | B2 * | 2/2024 | Zwicky | B60W 30/09 |
| 11,941,984 | B1 * | 3/2024 | Lamprecht | G08G 1/164 |
| 12,065,167 | B2 * | 8/2024 | Malla | G06V 10/25 |
| 12,286,136 | B2 * | 4/2025 | Murahashi | B60W 60/0011 |
| 2002/0054210 | A1 * | 5/2002 | Glier | G08G 1/164 |
| | | | | 348/E7.087 |
| 2004/0145496 | A1 * | 7/2004 | Ellis | G09B 21/006 |
| | | | | 340/905 |
| 2012/0025965 | A1 * | 2/2012 | Mochizuki | B60Q 9/008 |
| | | | | 340/435 |
| 2012/0146811 | A1 * | 6/2012 | Chou | G08G 1/096783 |
| | | | | 340/905 |
| 2012/0274481 | A1 * | 11/2012 | Ginsberg | G08G 1/096883 |
| | | | | 340/905 |
| 2013/0100286 | A1 * | 4/2013 | Lao | G06V 20/54 |
| | | | | 348/148 |
| 2014/0063196 | A1 * | 3/2014 | Daniel | G08G 1/096844 |
| | | | | 348/46 |
| 2014/0307087 | A1 * | 10/2014 | Evanitsky | G08G 1/052 |
| | | | | 348/143 |
| 2020/0202705 | A1 * | 6/2020 | Sakai | B60W 40/04 |
| 2020/0239031 | A1 * | 7/2020 | Ran | B60W 60/00184 |
| 2021/0065551 | A1 * | 3/2021 | Manohar | B60Q 9/008 |
| 2022/0028270 | A1 * | 1/2022 | Harada | G08G 1/0112 |
| 2022/0111837 | A1 * | 4/2022 | Yeom | B60W 30/02 |
| 2022/0324421 | A1 * | 10/2022 | Giovanardi | G08G 1/0145 |
| 2022/0340137 | A1 * | 10/2022 | Ollis | B60W 30/09 |
| 2023/0166743 | A1 * | 6/2023 | Heck | G06N 3/044 |
| 2023/0278544 | A1 * | 9/2023 | Wendt | B60W 30/08 |
| | | | | 701/1 |
| 2024/0196320 | A1 * | 6/2024 | Ogata | G08G 1/09 |
| 2024/0273752 | A1 * | 8/2024 | Cardona | G06F 16/29 |
| 2024/0317253 | A1 * | 9/2024 | Larsson | B60W 50/14 |
| 2024/0386795 | A1 * | 11/2024 | Vassilovski | G08G 1/0141 |

FOREIGN PATENT DOCUMENTS

| | | | | | |
|---|---|---|---|---|---|
| CN | 103236171 | A * | 8/2013 | ....... | G08G 1/096783 |
| CN | 109345874 | A * | 2/2019 | ........... | G08G 1/166 |
| CN | 109996174 | A * | 7/2019 | ........... | H04W 84/18 |
| CN | 110473419 | A * | 11/2019 | ....... | G08G 1/096725 |
| CN | 110517486 | A * | 11/2019 | ........... | G08G 1/0125 |
| CN | 111247574 | A * | 6/2020 | ........... | G08G 1/0129 |
| CN | 211335968 | U * | 8/2020 | ............... | B60T 8/58 |
| CN | 112309152 | A * | 2/2021 | ........... | G08G 1/164 |
| CN | 112572452 | A * | 3/2021 | ........... | G08G 1/165 |
| CN | 112885119 | A * | 6/2021 | ........... | G08G 1/01 |
| CN | 112908034 | A * | 6/2021 | ........... | H04W 4/44 |
| CN | 115240470 | A * | 10/2022 | ........... | H04W 4/40 |
| CN | 115171413 | B * | 8/2023 | ....... | G08G 1/096725 |
| CN | 117523884 | A * | 2/2024 | ........... | G08G 1/0967 |
| DE | 102013000200 | A1 * | 3/2014 | ........... | B60K 28/066 |
| DE | 102021101758 | A1 * | 8/2021 | ........... | G06T 7/246 |
| JP | 7195202 | B2 * | 12/2022 | ....... | G08G 1/096716 |
| WO | WO-2005038741 | A2 * | 4/2005 | ........... | G08G 1/08 |
| WO | WO-2009058784 | A1 * | 5/2009 | ........... | G08G 1/164 |
| WO | WO-2012145761 | A2 * | 10/2012 | ........... | G08G 1/04 |
| WO | WO-2020006154 | A2 * | 1/2020 | ........ | G02B 27/0093 |
| WO | WO-2020135991 | A1 * | 7/2020 | ........... | G08G 1/0129 |
| WO | WO-2022055452 | A1 * | 3/2022 | ........... | G08G 1/081 |
| WO | WO-2022223952 | A1 * | 10/2022 | ........... | G06N 3/045 |
| WO | WO-2023231464 | A1 * | 12/2023 | ........... | G08G 1/07 |

* cited by examiner

| Traffic Signal Violation Indicators | | | | | | Traffic Signal Violation Risk Level |
|---|---|---|---|---|---|---|
| FCM-Based Signal Detection | I2V-Based Signal Phasing and Timing | V2V-Based Warning | DMS-Based Distracted Driver Detection | Sun Glare Detection | Unfamiliar Intersection | |
| Unknown | Unknown | Unknown | Unknown | Unknown | Unknown | Unknown |
| FALSE | FALSE | FALSE | FALSE | FALSE | FALSE | No |
| TRUE | Unknown/False | Unknown/False | Unknown/False | Unknown/False | Unknown/False | Low |
| Unknown/False | TRUE | Unknown/False | Unknown/False | Unknown/False | Unknown/False | Low |
| Unknown/False | Unknown/False | TRUE | Unknown/False | Unknown/False | Unknown/False | Low |
| TRUE | TRUE | Unknown/False | Unknown/False | Unknown/False | Unknown/False | Low |
| Unknown/False | TRUE | TRUE | Unknown/False | Unknown/False | Unknown/False | Low |
| TRUE | Unknown/False | TRUE | Unknown/False | Unknown/False | Unknown/False | Low |
| TRUE | TRUE | TRUE | Unknown/False | Unknown/False | Unknown/False | Low |
| TRUE | TRUE | TRUE | TRUE | Unknown/False | Unknown/False | High |
| TRUE | TRUE | TRUE | Unknown/False | TRUE | Unknown/False | High |
| TRUE | TRUE | TRUE | Unknown/False | Unknown/False | TRUE | High |
| TRUE | TRUE | TRUE | TRUE | TRUE | TRUE | High |

FIG. 7

SYSTEM AND METHOD OF TRAFFIC SIGNAL VIOLATION RISK ASSESSMENT AND WARNING

INTRODUCTION

The present disclosure relates to assessing risks of collisions for moving vehicles; and more particularly to a system and method of traffic signal violation risk assessment and mitigation.

Object recognition systems and collision avoidance systems are common in modern vehicles. Such systems can provide a risk assessment and a warning to a vehicle operator about an object in the path of a moving host vehicle. The warning can include a visual indication on a vehicle's instrument panel, an audio warning such as chimes, and/or a haptic warning via a feedback device installed on a control surface such as the steering wheel. Object recognition systems can also provide input to active vehicle systems, such as adaptive cruise control systems, which control vehicle speed to maintain the appropriate longitudinal spacing to a leading remote vehicle. Collision avoidance systems can provide both warnings and automatic braking to avoid an imminent collision with an object in the path of the vehicle.

Object recognition systems and collision avoidance systems achieves their purposes of object recognition, collision risk assessment, and mitigation of potential collisions with objects in the paths of vehicles. However, there is a need for a system and/or a method for traffic signal recognition, risk assessment of violation of the traffic signal by a host vehicle and other vehicles approaching the traffic signal, and mitigation of such risks.

SUMMARY

According to several aspects, a method of traffic signal violation risk assessment is provided. The method includes a host vehicle approaching an intersection, determining if the intersection has a traffic signal and gathering intersection information. The intersection information includes traffic signal data comprising traffic signal current state (TSCS) and time to next state (TTNS). The method further includes determining a time of arrival at the intersection (TAI) by the host vehicle, determining a risk level of a traffic signal violation by the host vehicle based on the TSCS, TTNS, and TAI by the host vehicle, and implementing a first remedial action in response to the risk level determined to be a low risk, and a second remedial action in response to the risk level determined to be a high risk. The first remedial action includes a unicast warning and the second remedial action includes a geocast warning. the second remedial action may further include takin partial control of the vehicle by a vehicle control module. Partial control includes at least one of emergency braking, steering control, and preconditioning the vehicle such as pre-tensioning the seat belts.

In an additional aspect of the present disclosure, the TSCS includes one of a GO state and a STOP state. The method further includes determining the TSCS is the STOP state and TAI is less than TTNS, or the TSCS is the GO state and TAI is greater than TTNS before determining a risk level of a traffic signal violation by the vehicle.

In another aspect of the present disclosure, the TSCS and TTNS of the traffic signal is gathered wirelessly from at least one of a remote server, a roadside unit (RSU), and a mobile edge computer (MEC) in communications with the traffic signal.

In another aspect of the present disclosure, the host vehicle includes a forward viewing camera configured to capture images of dynamic traffic signals forward of the vehicle. The TSCS of the traffic signal is determined based on the captured images.

In another aspect of the present disclosure, the method further includes determining a current attention state of an operator of the host vehicle and determining an intensity of sunlight based on a horizontal direction of sunlight and whether the sunlight is directly within a cone of vision of the operator. Wherein determining a risk level of a traffic signal violation by the host vehicle is further based on the current attention state of the operator and intensity of sunlight.

In another aspect of the present disclosure, the intersection information further includes traffic information on remote vehicles approaching the intersection and determining a number of times the host vehicle has traveled through the intersection. Wherein determining a risk level of a traffic signal violation by the host vehicle is further based on the traffic information on vehicles approaching the intersection and a familiarity of the intersection based on the number of times the host vehicle has traveled through the intersection.

In another aspect of the present disclosure, wherein determining a risk level of a traffic signal violation by the host vehicle includes fusing the intersection information, current attention state of the operator, intensity of sunlight, and familiarity with the intersection utilizing one of a look-up table and a fuzzy logic approach.

In another aspect of the present disclosure, the intersection information further includes traffic information on a remote vehicle approaching the intersection. The method further includes determining a time of arrival at the intersection (TAI) by the remote vehicle, and determining a risk level of a traffic signal violation by the remote vehicle based on the TSCS, TTNS, and TAI by the remote vehicle.

According to several aspects, a system for traffic signal violation risk assessment for a vehicle is provided. The system includes a vehicle sensor such as a front camera module (FCM) configured to capture an image data in a field of view forward the vehicle; a vehicle communications system configured for at least one of vehicle-to-infrastructure (V2I) communications and telematic communications with an infrastructure unit, wherein the infrastructure unit is capable of providing intersection information; and a traffic signal violation risk assessment (TSVR) module in communication with the FCM and the vehicle communications system. The TSVR module is configured to: analyze the captured image data to determine an intersection, a traffic light at the intersection, and a traffic light current state (TLCS); collect intersection information from the infrastructure unit, wherein the intersection information includes the time to next state (TTN) of the traffic light at the intersection; determine a risk of traffic signal violation based on the TLCS and TTN; and implement a physical action to mitigate the risk of traffic signal violation.

In an additional aspect of the present disclosure, wherein determine a risk of traffic signal violation includes determine one of a low risk and a high risk. The physical action includes unicasting a warning in response to a determined low risk and geocasting a warning in response to a determined high risk. Geocasting includes at least one of changing the traffic light current state and turning on a strobe light at the intersection In another aspect of the present disclosure, the TSVR module is further configured to determine a time of arrival at the intersection (TAI) by the vehicle. The TLCS includes one of a GO state and a STOP state. The TLCS is the STOP state and the TAI is less than TTNS OR the TSCS is the GO state and the TAI is greater than the TTNS before initiating the determine the risk of the traffic signal violation.

In another aspect of the present disclosure, the system further includes an ambient light sensor module configured to determine an intensity of sunlight and a driver monitoring system configured to determine a current attention state an operator of the host vehicle. The TSVR module is further configured to determine the risk of traffic signal violation based on the TLCS, TTN, the intensity of sunlight, and the level of current attention state of the operator.

In another aspect of the present disclosure, the TSVR module is further configured to utilize a look-up table or fuzzy logic to fuse the intersection traffic information, the intensity of sunlight, the current attention state of the operator, and the level of familiarity with the intersection to determine a risk of traffic signal violation by at least one of the host vehicle.

According to several aspects, a traffic signal violation risk assessment (TSVR) module is provided. The TSVR module includes a processor; a computer readable media having instructions to cause the processor to: analyze an image of a front view of a vehicle to identify an intersection; determine the intersection has a traffic signal; communicate with infrastructure units to determine a current state of the traffic signal, a time until the next change of state of the traffic signal, and vehicle traffic approaching the intersection; determine a level of risk of traffic signal violation by a vehicle based on the current state of the traffic signal, the time until the next change of state of the traffic signal, and the vehicle traffic approaching the intersection, wherein the level of risk includes one of a low risk and a high risk; and unicast a warning in response to a determined low risk and geocasting a multimodal proactive warning in response to a determined high risk together with instructing a vehicle controller to take at least partial control of the vehicle in response to the predetermined high risk.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a fusion logic look-up table for assessing a risk level for a traffic signal violation, according to an exemplary embodiment.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term module, control module, or controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

Figure 1:
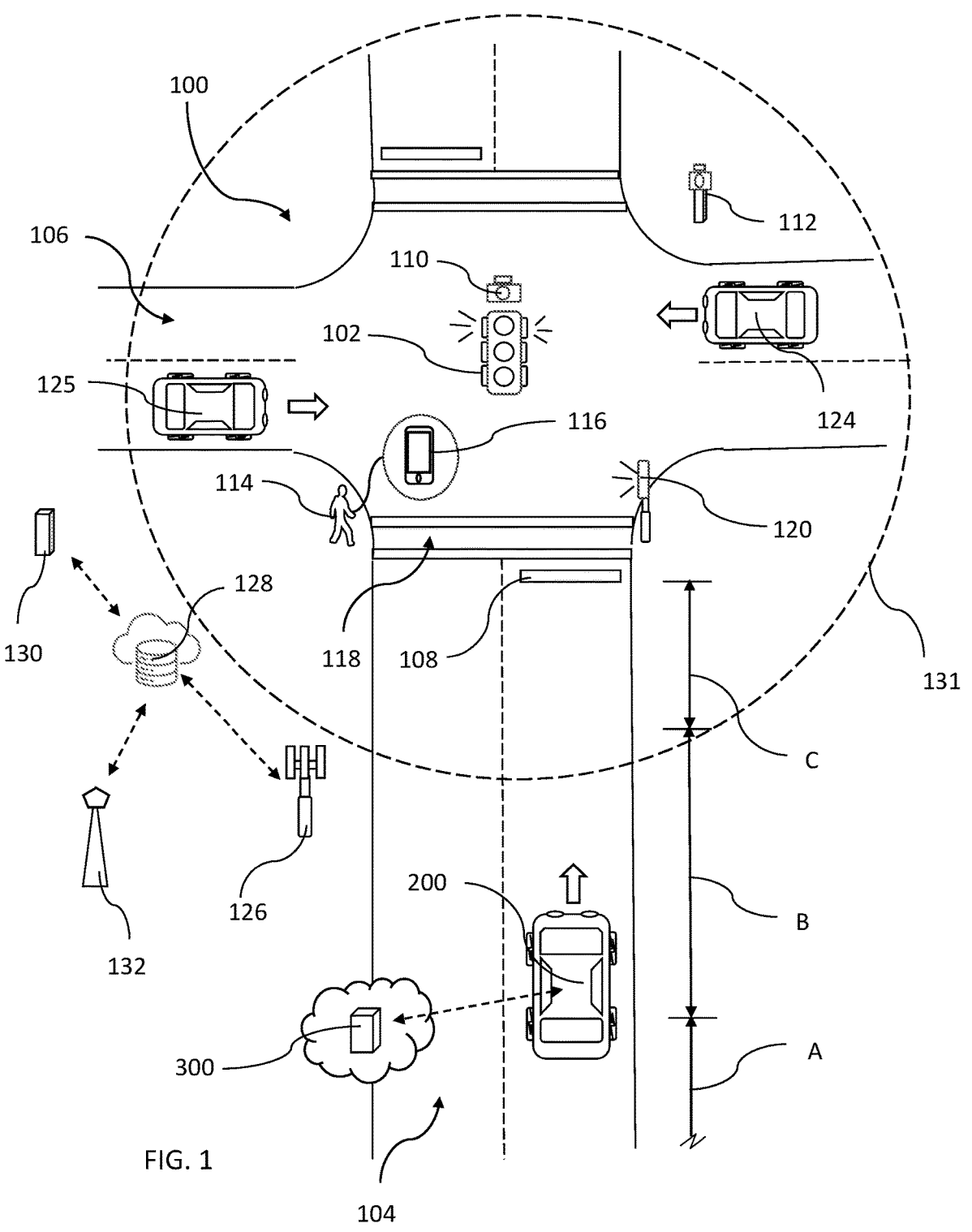
FIG. 1 is an illustration of a plan view of a road intersection having a dynamic traffic signal, according to an exemplary embodiment.

FIG. 1 is an illustration of a non-limiting example of a plan view of a road intersection 100 having a dynamic traffic signal 102 configured to manage vehicle traffic flow through the road intersection 100. The road intersection 100 is defined by a first roadway 104 crossing a second roadway 106. Each of the first roadway 104 and the second roadway 106 is configured for two-way vehicle travel. The first roadway 104 includes a road marking 108, shown as a white solid line 108, located perpendicular to the first roadway 104 and prior to the intersection 100 in the direction of travel toward the intersection 100. The white solid line 108 is referred to as a stop line 108 and designates a stopping location for a vehicle responding to a stop signal or command issued by the traffic signal 102.

In the direction of travel toward the intersection, three predetermined decision zones are shown. The predetermined decision zones are designated as Zone A, a Zone B, and a Zone C. Zone A is located the greatest distance from the stop line 108 as compared to Zone B and C. Zone B is located a greater distance from the stop line 108 than Zone C. Zone C is immediately adjacent to the stop line 108. Zone A is a probable stop zone, Zone B is the decision or dilemma zone, and Zone C is the probable go zone. The dilemma zone (Zone B) is an area of an intersection approach where a vehicle operator is presented with a condition traffic signal, such as a yellow signal indication. In response to the condition traffic signal the vehicle operator needs to decide as to whether to continue through the intersection 100 or stop before the intersection 100. The dilemma zone allows an estimate time between 2.5 and 5.5 seconds to effectuate a stop of the vehicle before arriving at the stop line 108 in response to a decision to stop before the intersection 100.

The dynamic traffic signal 102 is disposed at the road intersection 100 and is visible to vehicles approaching the intersection 100 on the first roadway 104 and on the second roadway 106. The traffic signal 102 is capable of sequencing between visual indicators, also referred to as phases or states, to manage the flow of vehicle traffic through the intersection 100. Common visual indicators may include words, symbols, and/or colors. In a non-limiting example, the color indicators includes a green state, a yellow state, and a red state to instruct the vehicles to continue through the intersection 100, prepare to stop before the intersection 100, or stop at the intersection 100, respectively.

A traffic camera 110 is shown disposed at the intersection 100 proximal to the traffic signal 102 and configured to monitor the flow of vehicle traffic approaching and through the intersection. The traffic camera 110 may be used to monitor the weather and road conditions proximal to the intersection 100. The traffic camera 110 may be pointed in the direction of approaching traffic and synchronized with the traffic signal change of states to detect vehicles at risk of violations of the traffic signal. Additional cameras 112 may be mounted about the intersection 102 to observe vehicle and pedestrian traffic crossing the intersection.

A pedestrian 114 having a personal communications device 116, such as a cellphone 116, is shown approaching a crosswalk 118 extending across the first roadway 104. A pedestrian traffic signal 120 is shown on an end of the crosswalk 118 and is configured to manage pedestrian traffic across the first roadway 104. The pedestrian traffic signal 120 may include a visual indicator and/or an audial indicator to instruct pedestrians to walk across the roadway or do not walk across the roadway.

A host connected vehicle 200, or host vehicle 200, is shown approaching the intersection on the first roadway. A remote connected vehicle 124 is shown approaching the intersection 100 on the second roadway 106. A non-connected remote vehicle 125 is shown approaching the intersection 100 in the opposite direction of the remote connected vehicle 124. The host vehicle 200 is in communication with a Traffic Signal Violation Risk Assessment (TSVRA) system 300, which may be located onboard the host vehicle 200, offboard the host vehicle 200, or partially onboard and offboard the host vehicle 200. The (TSVRA) may be configured for vehicle-to-anything communications (V2X).

At least one roadside unit (RSU) 126 and/or mobile edge computer (MEC) 130 is disposed proximal to the intersection 100. The RSU 126 and MEC 130 are configured to intersection data and transmit the intersection data to traffic control devices, such as the traffic signals 102, 120 as well as to central traffic management centers. The RSU 126 and MEC 130 are configured to communicate with remote servers 128, such as servers located on the cloud or back offices, and/or with cellular infrastructure 132 to upload or retrieve data relevant to the safe operations of the intersection. The RSU, MEC 130, remote servers 128, and/or cellular infrastructure 132 may wirelessly communicate the intersection data to connected vehicles operating within a predetermined boundary 131 surrounding the intersection 100. Such intersection data may include, but not limited to, location of the intersection, state of the traffic light, time to next state of the traffic light, information on vehicles approaching the vehicles, road conditions, weather conditions, sun glare, etc. The RSU 126 and MEC 130 may be configured to communicate with connected vehicles approaching the intersection and personal devices either directly using infrastructure-to-vehicle (I2V) communications, wireless telematic services 132, and/or internet.

Figure 2:
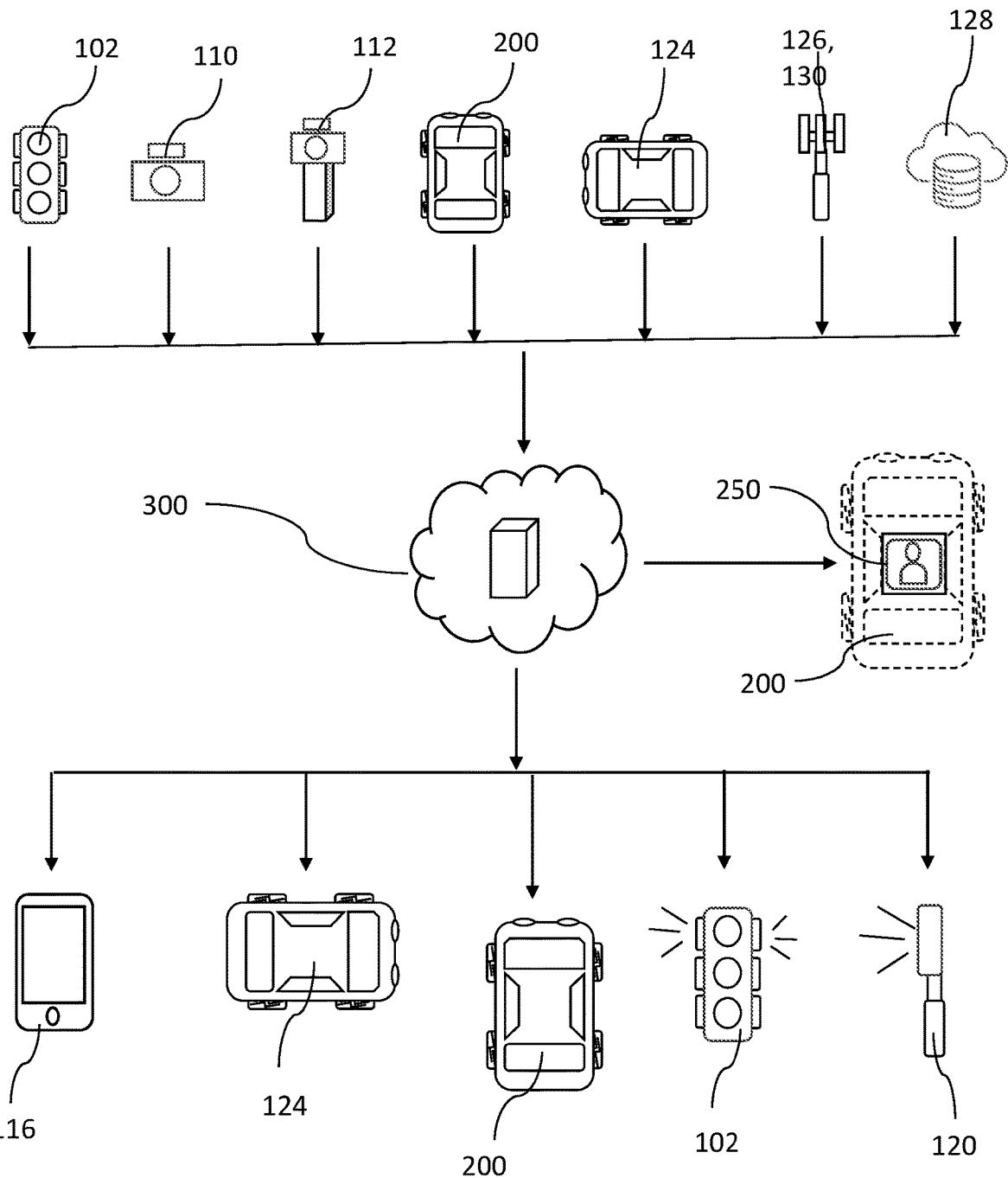
FIG. 2 is a high-level functional flow diagram of a method of assessing risks of traffic signal violation by a vehicle approaching the intersection of FIG. 1, according to an exemplary embodiment.

FIG. 2 is a high-level functional flow diagram of a method of assessing a risk of traffic signal violation by a vehicle approaching the intersection of FIG. 1. A traffic signal violation is defined as a vehicle proceeding through an intersection when the traffic signal indicates a stop command for that vehicle. In a non-limiting example, a traffic signal violation may be that of a vehicle not stopping at a redlight. The vehicle may include that of the host vehicle 200, remote connected vehicle 124, and remote non-connected vehicle 125. The TSVRA system 300 collects information from the host vehicle 200, remote connected vehicles 124 using V2V communication, and infrastructure based sources using I2V communications. Infrastructure based sources include, but are not limited to, traffic signal 102, cameras 110, 112, RSU, 126, and MEC 130, remote servers 128.

Information collected from the host vehicle 200 includes, but are not limited to, data collected from a front camera module (FCM), driver monitoring system (DMS), and ambient light sensor module. The FCM is configured to detect traffic light state, remote vehicles, and vulnerable road users (VRU) such as pedestrians and cyclists. The DMS monitors the vehicle operator's level of attention to operating the vehicle status. The ambient light sensor module may be used to determine the intensity of sunlight shining based on the horizontal direction of sunlight and whether the sunlight is directly within cone of vision of the operator.

Information collected from infrastructure based sources include, but are not limited to, traffic signal state and time to next state, traffic camera information, historical intersection safety records, and historical host vehicle map data assess the risk of red-light violation. The historical host vehicle map data may indicate whether the operator of the host vehicle 200 is familiar with the intersection 100.

Information collected from the remote connected vehicle 124 approaching the intersection include, but are not limited to, the traffic light signal observed by the remote connected vehicle, time of arrival at the intersection, and observations of the behavior other vehicles and/or pedestrians at or near the intersection.

The collected information is analyzed to determine a level of risk that a vehicle, including the host vehicle 200, remote connected vehicle 124, and remote non-connected vehicle 125, may violate the traffic signal 102. An information fusion model such as a look-up table, a fuzzy logic-based approach, and/or a weight scheme that combines the three criteria using weights that inversely proportional with the uncertainty of each element quantified using its variance or a Dempster's rule of combination that takes into consideration the degree of belief of each criterion to determine a risk level ranging from a no risk, a low risk, to a high risk.

In a non-limiting example, no action is taken if the risk level is determined be an unknown or am unknown or zero risk; a unicast warning may be issued to a human machine interface 250 within the host vehicle 200 if the risk level is determined to be a low risk level; or a geocast warning may be broadcasted to personal communication devices 116 of VRUs and remote connected vehicles 124 if the risk level is determined to be a high risk level. The geocast warning may also be broadcasted to the traffic signal 102 and/or pedestrian traffic signal 120 to alter the current traffic signal state and/or turn on a strobe light to mitigate a high risk level. Furthermore, if the host vehicle 200 is equipped with an autonomous driving feature, such as braking or steering, the TSVRA system 300 may activate the ADS and/or ADS to mitigate a potential of a collision event.

Figure 3:
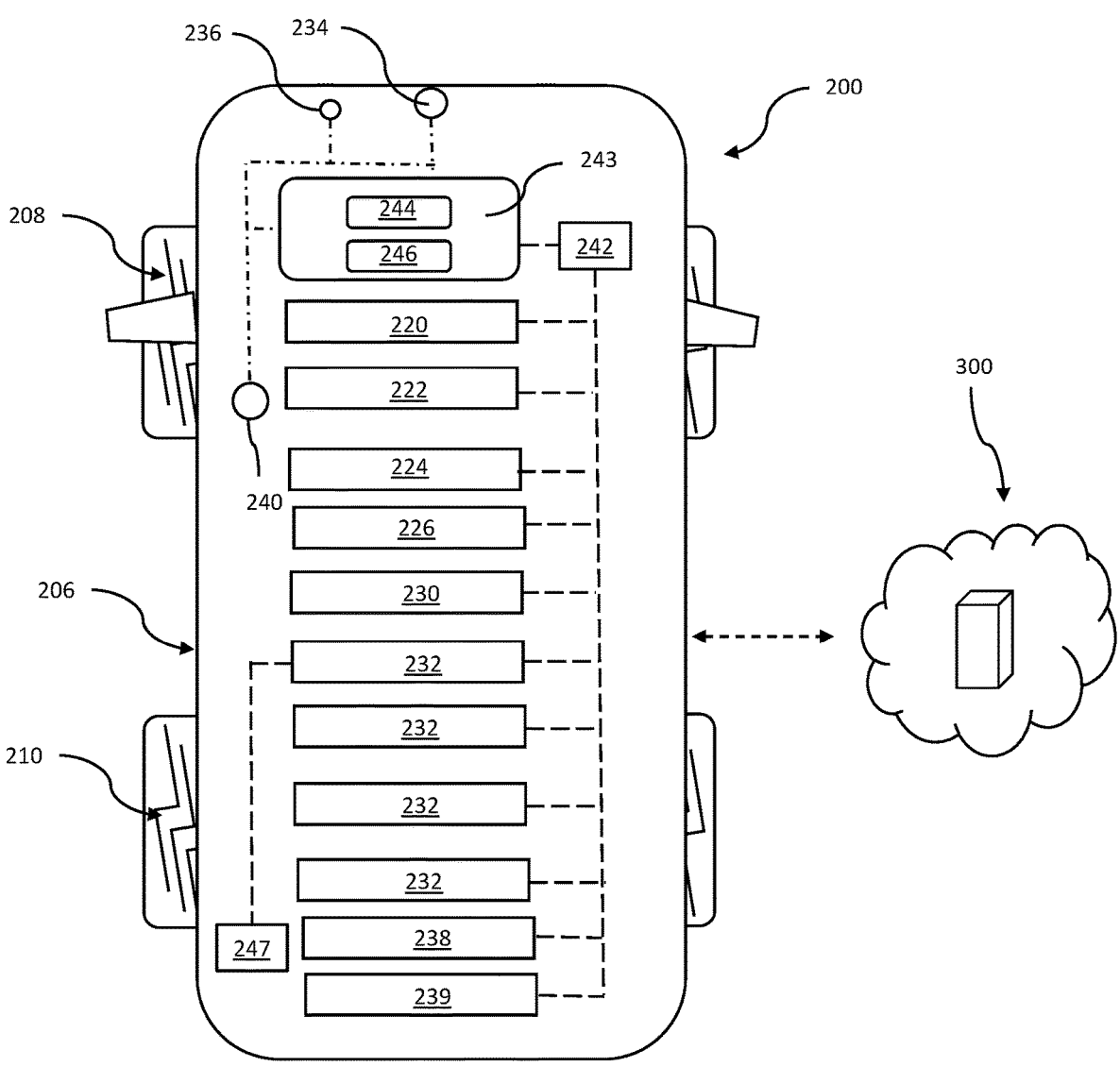
FIG. 3 is functional diagram of a connected host vehicle, according to an exemplary embodiment.

FIG. 3 is a functional diagram of a connected host vehicle 200 in communication with a Traffic Signal Violation Risk Assessment (TSVRA) system 300. While the TSVRA system 300 is shown outside of the host vehicle 200, it is contemplated that some or all of the components defining the TSVRA system 300 may be part of the host vehicle 200. In one non-limiting example, the TSVRA system 300 may be a cloud-based system in wireless communication with the host vehicle 200. In another non-limiting example, the TSVRA system 300 may be a vehicle system in communication with the various other vehicle systems onboard the vehicle.

The vehicle 200 generally includes a body 206, front wheels 208, and rear wheels 210. The body 206 substantially encloses the systems and components of the vehicle 200. The front wheels 208 and the rear wheels 210 are each rotationally coupled to the body 206 near a respective corner of the body 206. Although the host vehicle 200 is shown as a sedan, it is envisioned that that host vehicle 200 may be another type of vehicle, such as a pickup truck, a coupe, a sport utility vehicle (SUVs), a recreational vehicle (RVs), motorcycles, and on-road non-motorized vehicles, such as bicycles, capable of wireless connection infrastructure and/or internet using personal communication devices 116 or similar.

Irrespective of the type of vehicle, the host vehicle 200 is capable of communications with other connected vehicles, connected roadside units (RSU) or cloud computing services using wireless cellular communications, Dedicated Short-range Communication (DSRC), cellular-based vehicle-to-everything communications (C-V2X) technology. The host vehicle 200 may be a smart vehicle equipped with an Advanced Driver-Assistance System (ADAS) configured to enhance the safe operation of the vehicle and/or equipped with an Automated Driving System (ADS) capable of operating from Level 0 (no driving automation) to Level 5 (full driving automation) in accordance with SAE J3016 levels of driving automation.

As shown, the vehicle 200 generally includes a propulsion system 220, a transmission system 222, a steering system 224, a brake system 226, a vehicle communications system 230, a driver monitoring system (DMS) 232, an ADAS 238 and/or ADS 239, a plurality of sensors 240, and actuators 242. The vehicle 200 further includes one or more vehicle controllers 243, also referred to controller 243, in communication with one or more vehicle systems, sensors 240, 234, 236, and actuators 242. The controller 243 is also in communication with the TSVRA system 300 for assessing risk of traffic signal violations and with the ADAS 238 and/or ADS 239 for mitigating such risks.

The plurality of sensors 240 collect information and generate sensor data indicative of the collected information. As non-limiting examples, the sensors 240 may include Global Navigation Satellite System (GNSS) transceivers or receivers, yaw rate sensors, speed sensors, lidars, radars, ultrasonic sensors, and external and in-cabin cameras, among others. The GNSS transceivers or receivers are configured to detect the location of the host vehicle 200. The speed sensors are configured to detect the speed of the host vehicle 200. The yaw rate sensors are configured to determine the heading of the host vehicle 200.

The sensors 240 further includes a front camera module (FCM) 234 and an ambient light sensor module 236. The FCM 234 has a field of view large enough to capture images in front of the vehicle 200. The FCM 234 is configured to detect dynamic traffic signals, such as traffic lights, as well as recognize the change in states of the dynamic traffic signals. It should be appreciated that the vehicle sensors 240 may include Light Detection and Ranging (LIDAR) unit, heat scanner, and other external data sensors may be configured to detect dynamic traffic signals as well as recognize the change in states of the dynamic traffic signals. The ambient light sensor module 236 is configured to detect the intensity of sunlight based on the horizontal direction of the sunlight and whether the sunlight is directly within the cone of vision of the operator.

The vehicle controller 243 includes at least one vehicle processor 244 and a vehicle non-transitory computer readable storage device or media 246. The vehicle processor 244 may be a custom made or commercially available processor, a central processing unit (CPU), a graphics processing unit (GPU), an auxiliary processor among several processors associated with the vehicle controller 243, a semiconductor-based microprocessor (in the form of a microchip or chip set), a macro processor, a combination thereof, or generally a device for executing instructions. The vehicle computer readable storage device or media 246 may include volatile and nonvolatile storage in read-only memory (ROM), random-access memory (RAM), and keep-alive memory (KAM), as non-limiting examples. KAM is a persistent or non-volatile memory that may be used to store various operating variables while the vehicle processor 244 is powered down. The vehicle computer-readable storage device or media 246 of the vehicle controller 243 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 243 in controlling the host vehicle 200. The vehicle non-transitory computer readable storage device or media 246 may store map data and/or sensor data received from one of the sensors 240. The sensor data may include localization data received from the GNSS transceiver. The map data includes a navigation map.

The vehicle communications system 230 may include one or more communication transceiver 247. Each of the communication transceiver 247 is configured to wirelessly communicate information to and from other remote entities, such as remote connected vehicles 124, RSU 126, MEC 130, infrastructure (through "V2I" communication), remote servers 128 on the cloud or at a back office or remote call center, and/or personal electronic devices 116, such as a smart phone. The communication transceiver 247 may be configured to communicate via a wireless local area network (WLAN) using IEEE 802.11 standards or by using cellular data communication. However, additional or alternate communication methods, such as Cellular V2X (C-V2X) a dedicated short-range communications (DSRC), are also considered within the scope of the present disclosure. DSRC channels refer to one-way or two-way short-range to medium-range wireless communication channels specifically designed for automotive use and a corresponding set of protocols and standards. Accordingly, the communication transceiver 247 may include one or more antennas for receiving and/or transmitting signals, such as cooperative sensing messages (CSMs). The communication transceiver 247 may be considered sources of data.

Figure 4:
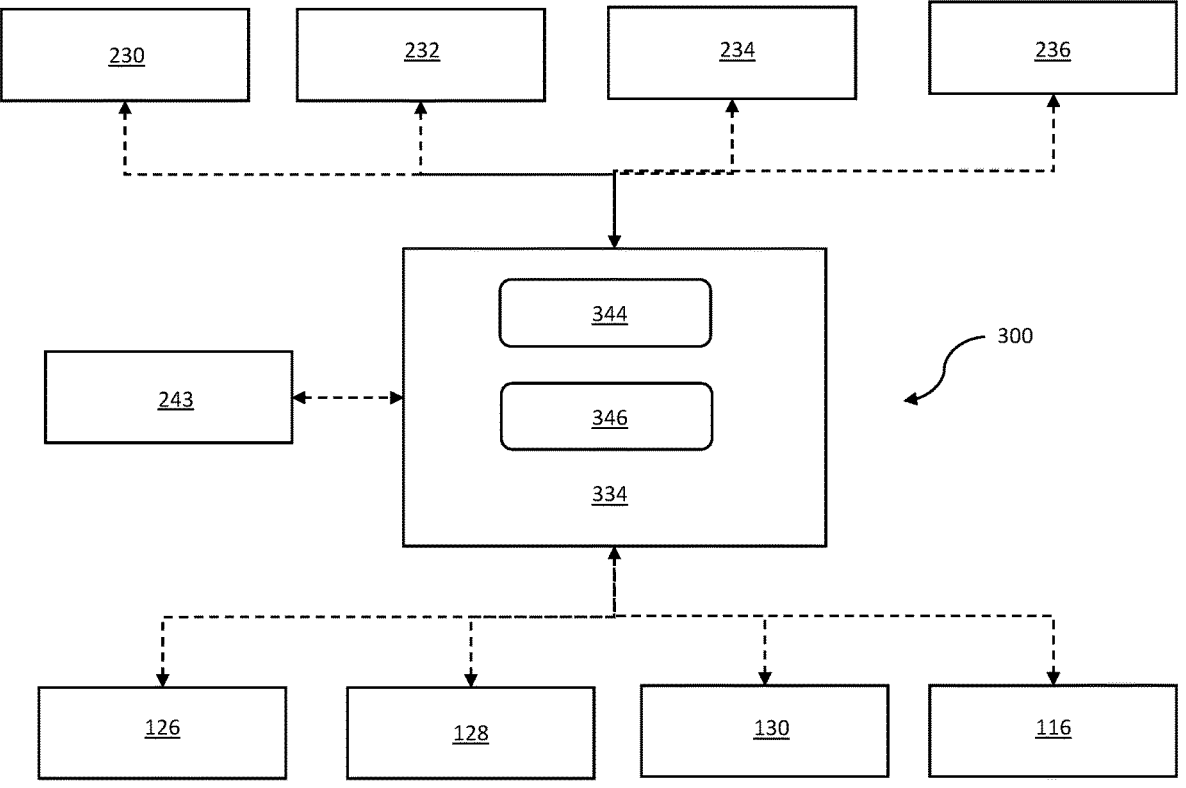
FIG. 4 is a functional block diagram of a Traffic Signal Violation Risk Assessment (TSVRA) module, according to an exemplary embodiment.
Figure 5:
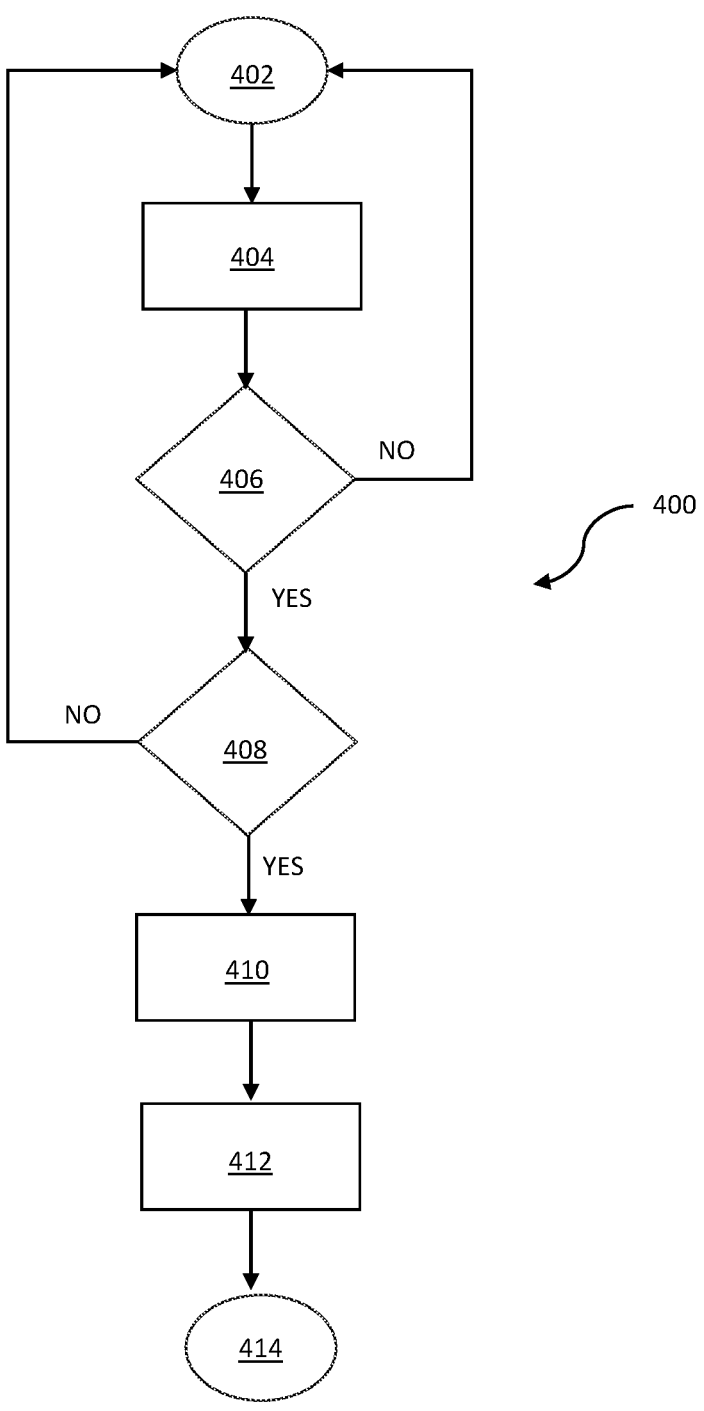
FIG. 5 is a flow chart of a method of assessing a traffic signal violation risk assessment, according to an exemplary embodiment.

Referring to FIG. 4, the TSVRA system 300 includes one or more TSVRA controller 334. The TSVRA controller 334 is configured to take into consideration the potential causes of traffic signal violations such as sun glare (e.g., being blinded by the sun that prevents the operator from seeing the red light), distraction (e.g., distracted or inattentive driver), driving score/record (e.g., aggressive driver), uncertainty (e.g., drivers not familiar with the intersection, and inexperienced drivers.

The TSVRA controller 334 includes at least one system processor 344 and a system non-transitory computer readable storage device or media 346. The system processor 344 may be a custom made or commercially available processor, a central processing unit (CPU), a graphics processing unit (GPU), an auxiliary processor among several processors associated with the TSVRA controller 334, a semiconductor-based microprocessor (in the form of a microchip or chip set), a macro-processor, a combination thereof, or generally a device for executing instructions. The system computer readable storage device or media 346 may include volatile and nonvolatile storage in read-only memory (ROM), random-access memory (RAM), and keep-alive memory (KAM), for example. The system computer-readable storage device or media of the TSVRA controller 334 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions.

The system non-transitory computer readable storage device or media 346 and/or the vehicle non-transitory computer readable storage device or media 346 includes machine-readable instructions that when executed by the one or more system processors 344 and/or vehicle processors 244, cause the system processors 344 and/or the vehicle processors 244 to execute the methods described below. The TSVRA controller 334 is in communications with the vehicle controller 243, vehicle systems, and sensors including, but not limited to, communication systems 230, DMS 232, FCM 234, and ambient light sensor module 236. The TSVRA controller 334 is also in communications with infrastructure units including, but not limited to, RSU 126, remote server 128, MEC 130, and personal communication devices 116.

The Method 400 starts at Block 402 as the host vehicle 200 is traveling on a roadway. At Block 404, the TSVRA controller 334 monitors the location of the host vehicle 200 and determines whether the host vehicle 200 is approaching an intersection having a dynamic traffic signal. Proceeding to Block 406, if the host vehicle 200 is not approaching an intersection having a dynamic traffic signal, the Method 400 returns to Block 402. Referring back to Block 406, if the host vehicle is approaching an intersection having a dynamic traffic signal, the Method proceeds to Block 408.

At Block 408, the TSVRA controller 334 determines whether the host vehicle 200 is within a predetermined decision zone relative to a stop line at the intersection. If the host vehicle 200 is not within the predetermined decision zone, the Method 400 returns to Block 402. Referring back to Block 408, if the vehicle is within the predetermined decision zone, the Method 400 process to Block 410.

At Block 410, the TSVRA controller 334 collects and analyzes information from the host vehicle 200; traffic signal current state and time to next state information obtained from the RSU 126, MEC 130, and/or remote servers 128 on cloud or in back offices; and traffic information from remote connected vehicles 124 proximal to the intersection. The TSVRA controller 334 may also analyze information obtained from the traffic cameras 110, 112 to determine if other remote vehicles 125, whether connected or not, are arriving at the intersection. The host vehicle 200 information includes, but are not limited to, current traffic signal state from the FCM 234, a state of operator distraction from the DMS 232, amount of sun glare from the ambient light sensor module 236, familiar intersection from historical map data and number of times the host vehicle 200 has traveled through the intersection, and other information such driver historical driving score and an intersection score based on accident records relevant to indicating a potential traffic signal violation risk at a particular intersection.

Proceeding to Block 410, information fusion approach may be used to fuse the relevant information (i.e. current signal state detection, signal phase and timing of traffic signal, warnings from infrastructure or connected vehicles, state of driver distraction, effect of sun glare, and unfamiliar intersections) to assess a risk level of traffic signal violation. This information fusion module can be a simple look-up table, a fuzzy logic-based approach or a weight scheme that combines the three criteria using weights that inversely proportional with the uncertainty of each element quantified using its variance or a Dempster's rule of combination that takes into consideration the degree of belief of each criterion.

In a non-limiting example, a fuzzy logic-based TSLVR, also referred to red light violation (RLV) risk, estimation may be utilized to estimate whether the traffic signal violation risk is unknown, zero, low, or high risk. The Indicators such as the FCM based red light detection, I2V based signal phase and timing, V2V based warning, DMS based distracted driver detection, sun glare detection, and unfamiliar intersections undergo a fuzzification process. The fuzzification of the 6 indicators are inputted into an inference mechanism operating on a predetermined rule base to estimate a risk level of a RLV.

Input set: $X = \{I_{FCM}, I_{I2V}, I_{V2V}, I_{DMS}, I_{sunglare}, I_{unfamiliarity}\}$ Output set: $M = \{\text{Red Light Violation (RLV) Risk}\} = \{m\}$ The total number of possible rules governing the fuzzy logic-based policy is given as $I = k_1 k_2 \ldots k_n$, where:

n is the number of non-interactive inputs; and $k_i$ is the number of partition of input universe of discourse i, $i \in \{1, 2, \ldots, n\}$.

For 6 indicators with 4 membership functions such as "no, unknown, low, high, the number of possible rules is $4^6 = 4096$. In practice, the actual number of rules necessary for the fuzzy inference rule base is much less than/because of the interpolative reasoning capability of the fuzzy model and because the fuzzy functions of the partitions overlap. The policy can be tweaked by adding or changing rules and by adjusting set boundaries. These rules can be created manually based on conducting some experiment to understand the relation between the contextual information and the signal conditioning mode. The rules can also automatically be learned from the example data using a learning algorithm such as neural networks or decision trees. Fused neuro fuzzy systems such as dynamic evolving neural-fuzzy inference system (DENFIS) can also be used.

The estimated RLV risk can be considered as explicit context of interest that is represented as a linguistic variable, then its term set T(b) could be: T(b)={No, Unknown, Low, High}. Each of the terms in T(b) is characterized by the fuzzy set in a universe of discourse U=[−3, 3].

In a non-limiting example: If $I_{FCM}$=70% High AND $I_{I2V}$=85% High AND $I_{V2V}$=90% unknown AND $I_{DMS}$=83% Yes AND $I_{Sunglare}$=30% Yes AND $I_{Unfamiliarity}$=15% Yes, Then RLV Risk=90% High.

In another non-limiting example: If $I_{FCM}$=82% No AND $I_{I2V}$=75% No AND $I_{V2V}$=84% No AND $I_{DMS}$=87% No AND $I_{Sunglare}$=75% No AND $I_{Unfamiliarity}$=92% Yes, Then RLV Risk=85% No Risk.

Other approaches can be used to fuse the six indicators such as using a look-up table as shown in FIG. 7 or a weighted scheme that combines the three criteria using weights that inversely proportional with the uncertainty of each element qualified using its variance or using Dempster's rule of combinations that takes into consideration the degree of belief of each criterion Proceeding to Block 412, a mitigation action may be activated based on the determined level of risk. No action is taken if the level of risk is determined to be a zero risk. A proactive warning can be geo-cast or unicast with the surrounding vehicles via V2V, with the infrastructure via V2I or with the vulnerable road users (VRUs) such as pedestrians/cyclists via cellphone based V2VRU communication through a safety APP the VRU may be subscribed to such as OnStar Guardian App.

In a non-limiting example, a unimodal proactive warning may be generated to warn the operator of the host vehicle 200 if the level of risk is determined to be a low risk. Proactive warnings may be a series of messages that can be pre-programmed to communicate to connected vehicles over V2V communications and to VRU over personal communication devices 116 and/or audible message broadcasted by over infrastructure within the boundary 131 of the intersection 100. The unimodal warning may be that of an audio warning, a visual warning on a HMI device, or a tactile warning. A multimodal proactive warning may be generated to warn connected vehicles 124 and VRU within a predetermined perimeter 131 bounding the intersection 102 if the level of risk is determined to be a high risk. Proactive warning can be unicast to a specific connected vehicle or vulnerable user (VRU) within the perimeter or geocast to multiple connected vehicles and/or VRU via the host vehicle V2V communications system directly, RSU/MEC, and/or the cloud using V2V, V2I, and/or telematic communications. If the host vehicle 200 is equipped with a ADAS and/or ADS, partial or full control of the host vehicle, such as emergency braking or steering, as well as preconditioning the vehicle, such as pre-tensioning the seatbelts, may be effectuated by the vehicle control module to mitigate a high risk determination. The Method ends at Block 414.

Figure 6:
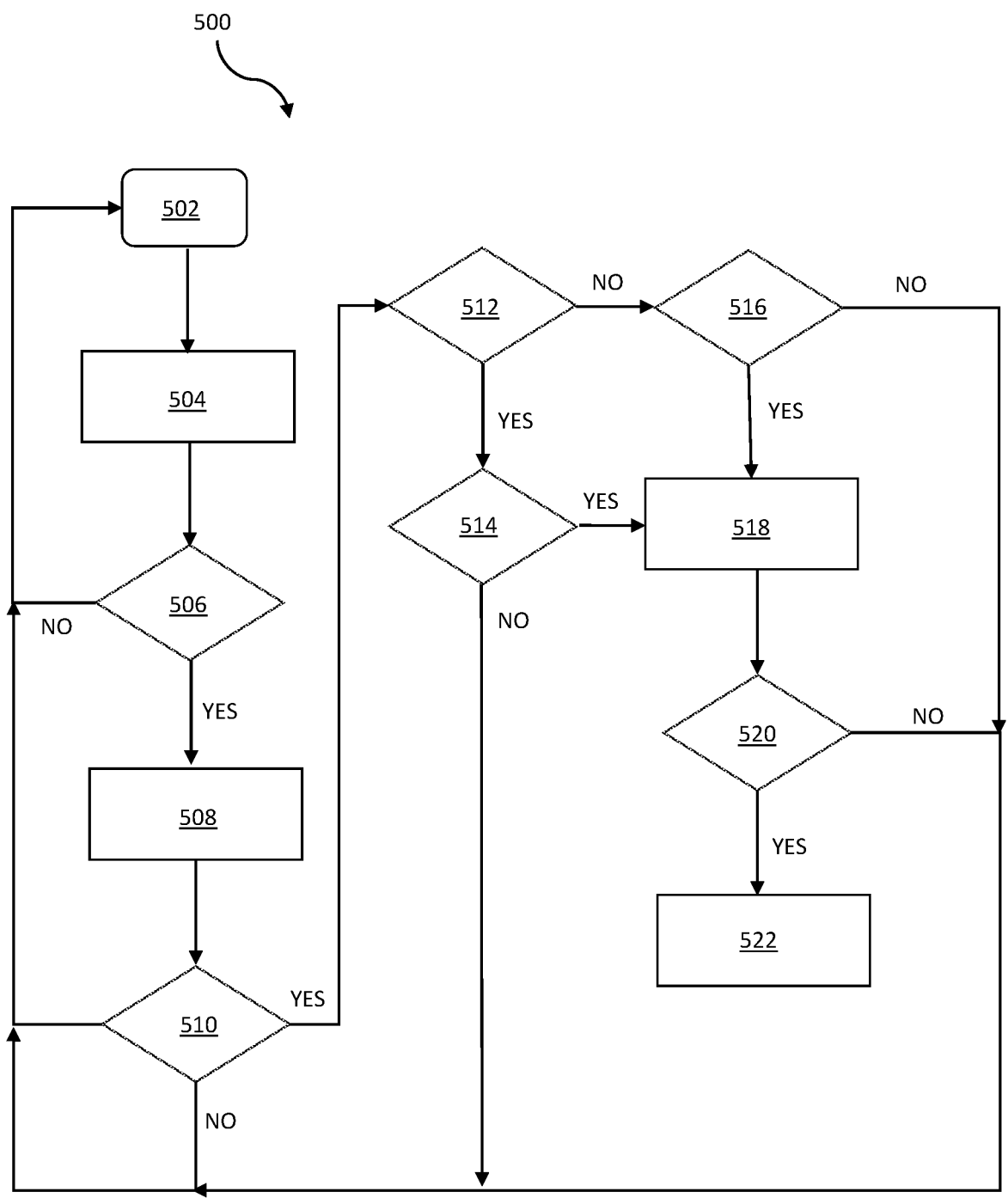
FIG. 6 is a flow chart of a method of determining an initiation of a method of assessing traffic violation risk assessment, according to another exemplary embodiment.

FIG. 6 shows a flow chart considering the time of arrival (TAI) of the host vehicle to the stop line 108 at the intersection 100, the traffic light current state (TLCS) or traffic signal current state (TSCS), and time to the next state (TTNS) in determining a traffic signal violation risk assessment. The Method 500 starts at Block 502 with the host vehicle 200 traveling on a road. Proceeding to Block 504 the host vehicle 200 retrieves map information from a remote server 128 located on the cloud server and/or in a back office. The map information includes the location of an upcoming intersection and whether the intersection has a traffic signal such as a traffic light.

Proceeding to Block 506, if the approaching intersection does not have a traffic light, the Method 500 returns to Block 502. Referring back to Block 506, if the intersection does have a traffic light and the host vehicle 200 is within a predetermined distance to the intersection, the Method 500 proceeds to Block 508.

At Block 508, the host vehicle 200 gather information from the FCM 234 to determine whether the current state of the traffic signal is red, yellow, or green state. The host vehicle 200 attempts to gathers information from a remote server or RSU to confirm the traffic light current state (TLCS) and the time to next state (TTNS). The TSVRA controller 334 calculates the TAI based on the current speed of the host vehicle 200.

Proceeding to Block 510, if the TAI is greater than a predetermined TAI threshold, the Method 500 returns to Block 502. A non-limiting example of a TAI threshold may be about 5.5 seconds. Referring back to Block 510, if the TAI is less than the predetermined TAI threshold, the Method 500 proceeds to Block 512.

At Block 512, if the TTNS is known, the Method 500 proceeds to Block 514. At Block 514, the information from the FCM 234 is analyzed to determine if the TLCS is in a no go command (RED) or prepare to stop command (YELLOW). If the TLCS is: (i) RED and the TAI to stop-line is less than TTNS, OR (ii) the TLCS is GREEN and the TAI is greater than the TTNS, then the Method 500 proceeds to Block 518, a traffic signal violation risk assessment is executed in accordance with Method 400. Otherwise the Method 500 returns to Block 502.

Referring back to Block 512, if the TTNS is not known, then the Method 500 proceeds to Block 516. At Block 516, if the TLCS is not RED and not YELLOW, then the Method 500 returns to Block 502. Referring back to Block 516, if the current state is RED or YELLOW, then the Method 500 proceeds to Block 518. At Block 518, a traffic signal violation risk assessment is executed in accordance with Method 400. If the traffic signal violation risk assessment is determined to be a low risk, a mitigation effort may include a unicast to warn the host vehicle.

Proceed to Block 520, determine if the TAI is less than the time required to stop at the stop-line (braking threshold). If the TAI is not less than the braking threshold, then the Method returns to Block 502. Referring back to Block 520, if the TAS is less than the braking threshold, then the Method proceeds to Block 522. At Block 522, if the traffic signal violation risk assessment is determined to be a high risk level, a warning is geocast and a collision mitigation action such as automatic braking is implemented if the host vehicle 200 is equipped with an ADAS 238 and/or ADS 239.

The present disclosure provides a wide array of signals and information to make a red-light violation risk assessment and subsequent action that goes out to vehicles, pedestrians via multiple channels: unicast, geocast, visual, etc. The description of the present disclosure is merely exemplary in nature and variations that do not depart from the general sense of the present disclosure are intended to be within the scope of the present disclosure. Such variations are not to be regarded as a departure from the spirit and scope of the present disclosure.

We claim:

1. A method of traffic signal violation risk assessment, comprising:

approaching, by a host vehicle, an intersection;

determining, by a module, the intersection has a traffic signal;

gathering intersection information, wherein the intersection information includes traffic signal data comprising a traffic signal current state (TSCS) and a time to next state (TTNS);

determining a time of arrival at the intersection (TAI) by the host vehicle;

determining a risk level of a traffic signal violation by the host vehicle based on the TSCS, TTNS, and TAI by the host vehicle, wherein the risk level of the traffic signal violation includes one of: a no risk level, a low risk level, and a high risk level; and implementing a first remedial action in response to the risk level determined to be a low risk, and a second remedial action in response to the risk level determined to be a high risk; and wherein the first remedial action includes a unicast warning and the second remedial action includes a geocast warning; and wherein the geocast warning includes altering the TSCS and activating a strobe light to mitigate the high risk.

2. The method of claim 1, wherein the second remedial action further includes taking partial control of the host vehicle by a vehicle control module, wherein the partial control includes at least one of emergency braking, steering control, and preconditioning of the host vehicle.

3. The method of claim 1, wherein the TSCS includes one of a GO state and a STOP state; and further includes determining the TSCS is the STOP state and the TAI is less than the TTNS, or the TSCS is the GO state and the TAI is greater than the TTNS before determining the risk level of the traffic signal violation by the host vehicle.

4. The method of claim 1, wherein the host vehicle includes a forward viewing camera configured to capture images of dynamic traffic signals forward of the host vehicle; and wherein the TSCS of the traffic signal is determined based on the captured images.

5. The method of claim 1, wherein the TSCS and TTNS of the traffic signal is gathered wirelessly from at least one of a remote server, a roadside unit (RSU), and a mobile edge computer (MEC) in communications with the traffic signal.

6. The method of claim 1, further includes:

determining, by a driver monitoring system (DMS), a current attention state of an operator of the host vehicle; and determining, by an ambient light sensor module, an intensity of sunlight based on a horizontal direction of sunlight and whether the sunlight is directly within a cone of vision of the operator; and wherein determining the risk level of the traffic signal violation by the host vehicle is further based on the current attention state of the operator and intensity of sunlight.

7. The method of claim 6, wherein the intersection information further includes traffic information on remote vehicles approaching the intersection; and wherein determining the risk level of the traffic signal violation by the host vehicle is further based on the traffic information on the remote vehicles approaching the intersection.

8. The method of claim 7, further includes:

obtaining a location of the intersection;

determining at least one of an intersection score and a number of times the host vehicle has traveled through the intersection; and determining a familiarity of the intersection based on the number of times the host vehicle has traveled through the intersection.

9. The method of claim 8, wherein determining the risk level of the traffic signal violation by the host vehicle includes fusing the intersection information, the current attention state of the operator, the intensity of sunlight, and the familiarity with the intersection utilizing one of a look-up table and a fuzzy logic approach.

10. The method of claim 1, wherein the intersection information further includes traffic information on a remote vehicle approaching the intersection; and further includes:

determining a time of arrival at the intersection (TAI) by the remote vehicle; and determining the risk level of the traffic signal violation by the remote vehicle based on the TSCS, TTNS, and TAI by the remote vehicle.

11. A system for traffic signal violation risk assessment for a vehicle, comprising:

a vehicle sensor configured to capture data in a field of view forward the vehicle;

a vehicle communications system configured for at least one of vehicle-to-infrastructure (V2I) communications and telematic communications with an infrastructure unit, wherein the infrastructure unit is capable of providing intersection information; and a traffic signal violation risk assessment (TSVR) module in communication with the vehicle sensor and the vehicle communications system, wherein the TSVR module is configured to:

analyze the captured data to determine an intersection, a traffic light at the intersection, and a traffic light current state (TLCS);

collect intersection information from the infrastructure unit, wherein the intersection information includes a time to next state (TTNS) of the traffic light at the intersection;

determine a risk of traffic signal violation based on the TLCS and TTNS; and implement a physical action to mitigate the risk of traffic signal violation;

wherein determine the risk of the traffic signal violation includes determine one of a low risk and a high risk;

wherein the physical action includes unicasting a warning in response to the determined low risk and geocasting a warning in response to the determined high risk; and wherein the geocasting the warning includes altering the TLCS and activating a strobe light to mitigate the high risk.

12. The system of claim 11, wherein the TSVR module is further configured to:

determine a time of arrival at the intersection (TAI) by the vehicle; and wherein the TLCS includes one of a GO state and a STOP state, and the TLCS is the STOP state and the TAI is less than the TTNS, OR the TSCS is the GO state and the TAI is greater than the TTNS before initiating the determine the risk of the traffic signal violation.

13. The system of claim 11, further comprising an ambient light sensor module configured to determine an intensity of sunlight; and wherein the TSVR module is further configured to the determine risk of traffic signal violation based on the TLCS, the TTN, and the intensity of sunlight.

14. The system of claim 13, further comprising a driver monitoring system configured to determine a current attention state of an operator of the vehicle; and wherein the TSVR module is further configured to the risk of the traffic signal violation based on the TLCS, the TTN, the intensity of sunlight, and the current attention state of the operator.

15. The system of claim 14, wherein the TSVR module is further configured to:

determine a location of the intersection; and determine a level of familiarity with the intersection based on the location of the intersection and historical travel logs; and wherein the TSVR module is further configured to the risk of traffic signal violation based on the TLCS, the TTN, the intensity of sunlight, the current attention state of the operator, and the level of familiarity with the intersection.

16. The system of claim 15, wherein the TSVR module is further configured to utilize a look-up table or fuzzy logic to fuse the intersection information, the intensity of sunlight, the current attention state of the operator, and the level of familiarity with the intersection to determine the risk of the traffic signal violation.

17. The system of claim 11, wherein the vehicle communications system is further configured for vehicle-to-vehicle (V2V) communications with a remote vehicle; and wherein the TSVR module is further configured to use the V2V communications to identify the remote vehicle approaching the intersection; and wherein determine the risk of the traffic signal violation is based on the TLCS, the TTN, and the remote vehicle approaching the intersection.

18. A traffic signal violation risk assessment (TSVR) module comprising:

a processor; and a computer readable media comprising instructions to cause the processor to:

analyze an image of a front view of a vehicle to identify an intersection;

determine the intersection has a traffic signal;

communicate with infrastructure units to determine a current state of the traffic signal, a time until the next change of state of the traffic signal, and vehicle traffic approaching the intersection;

determine a level of risk of traffic signal violation by the vehicle based on the current state of the traffic signal, a time until the next change of state of the traffic signal, and the vehicle traffic approaching the intersection, wherein the level of risk includes one of a low risk and a high risk; and unicast a warning in response to the determined low risk and geocasting a multimodal proactive warning in response to the determined high risk; and wherein the geocasting the multimodal proactive warning includes altering the current state of the traffic signal and activating a strobe light to mitigate the determined high risk.

19. The TSVR module of claim 18, wherein the computer readable media further comprises instructions to cause the processor to issues instructions to a vehicle controller to take at least partial control of the vehicle in response to the predetermined high risk.

* * * * *